United States Patent
Potts

[11] 3,782,405
[45] Jan. 1, 1974

[54] RELIEF VALVE
[75] Inventor: Matthew Potts, Solihull, England
[73] Assignee: Joseph Lucas (Industries) Limited, Birmingham, England
[22] Filed: Apr. 24, 1972
[21] Appl. No.: 246,582

[30] Foreign Application Priority Data
Apr. 29, 1971  Great Britain...................... 12249/71

[52] U.S. Cl. ............................................... 137/110
[51] Int. Cl............................................. F16k 17/06
[58] Field of Search..................... 137/110, 115, 118

[56] References Cited
UNITED STATES PATENTS
2,500,627  3/1950  Chinn ................................. 137/118

Primary Examiner—William R. Cline
Attorney—John C. Holman et al.

[57] ABSTRACT

A relief valve includes a plunger in a bore in a body which is movable against spring loading by the pressure in the body to a position such that fluid can spill past the plunger when the pressure rises above a predetermined level. The plunger has a restricted passage through which vapour can leak away. On application of pressure to the bore the plunger is first moved against a light spring until it engages a closure member which closes the passage and the plunger and closure member there after move against a stronger spring to control spilling.

5 Claims, 1 Drawing Figure

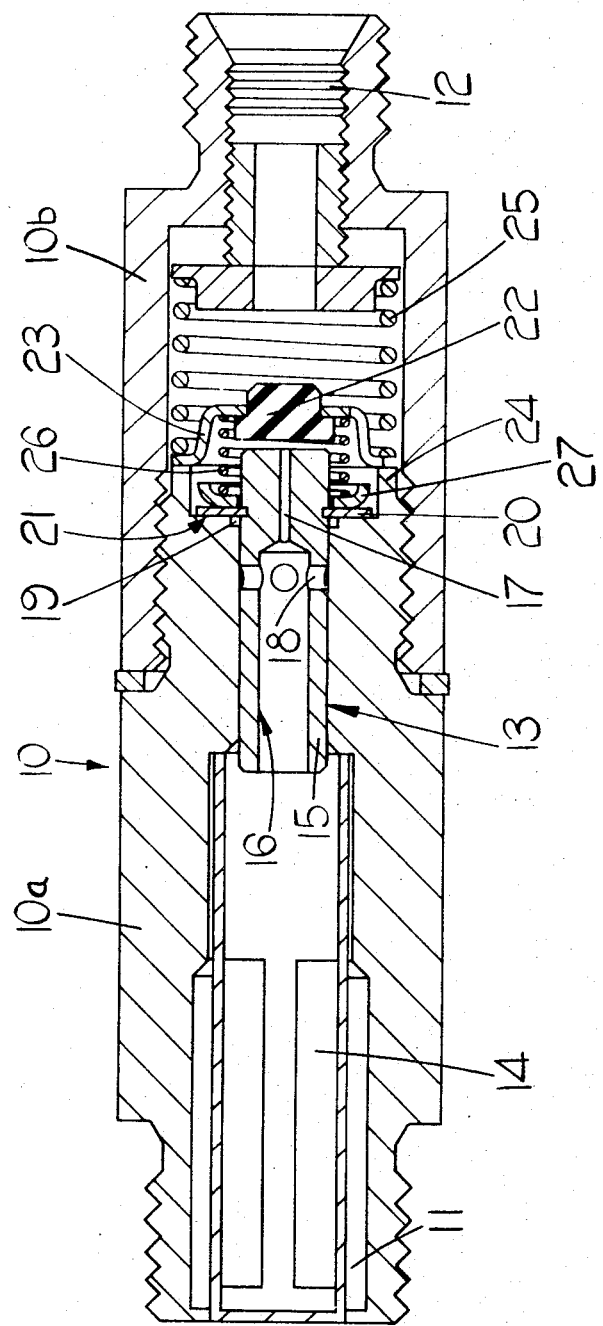

RELIEF VALVE

This invention relates to relief valves, and has as an object to provide such a valve in a convenient form.

A relief valve according to the invention comprises a body having an inlet, an outlet and a bore interconnecting said inlet and outlet, a plunger slidable in said bore and displaceable towards the outlet by fluid pressure in the inlet, said plunger having an axial bore opening at the end of the plunger adjacent the inlet, a transverse passage communicating with said bore and opening intermediate the ends of the plunger and a restricted axial passage connecting said bore to the other end of the plunger, said transverse passage co-operating with said bore in the body to provide a variable orifice between said inlet and outlet, a closure member engageable with the end of said plunger remote from the inlet to prevent fluid flow through said restricted passage, first biasing means urging said closure member towards said plunger, means limiting movement of said closure member in response to said first biasing means and second biasing means urging said plunger away from said closure member, the arrangement being such that the plunger can move under the influence of fluid pressure in the inlet, initially against said second biasing means to engage said closure member and subsequently against said first biasing means to open the said variable orifice.

An example of a relief valve according to the invention will now be described with reference to the accompanying drawing, which shows a longitudinal section through the valve.

The valve has a generally cylindrical body 10 having an inlet 11 and outlet 12. Body 10 is formed of two sealingly connected parts 10a, 10b. Part 10a has an axial bore 13 which interconnects inlet 11 and outlet 12. A filter 14 is mounted in a slotted support 14a between inlet 11 and bore 13.

A plunger 15 is slidable in bore 13. Plunger 15 has an axial through passage 16 which includes a restricted portion 17. Plunger 15 also has transverse passages 18 which communicate with passage 16 and co-operate with a shoulder 19 of body part 10a to provide a plurality of variable metering orifices between inlet 11 and outlet 12.

Plunger 15 has secured thereto a circlip 20 which is engageable with an axial face 21 of body part 10a to limit movement of plunger 15 to the left as seen in the drawing. A resiliently deformable closure member 22 is axially aligned with plunger 15 and is engageable with the end thereof remote from inlet 11 to prevent fluid flow through portion 17 of passage 16. Closure member 22 is supported by a spider member 23 which is biased against an end face 24 of body part 10a by first biasing means in the form of a spring 25. Second biasing means in the form of a further spring 26 is engaged between spider member 23 and a washer 27, which abuts circlip 20 to bias plunger 15 away from closure member 22.

The valve is particularly adapted for use with petrol supply systems for road vehicles. In use, inlet 11 is connected to a petrol supply line, and outlet 12 to a low pressure return line. When no fuel is being supplied to the engine, pressure at inlet 11 is at or near atmospheric pressure and plunger 15 is urged under the influence of springs 25, 26 to the position shown. Vapour from the fuel can thus escape via the restricted portion 17 of passage 16.

The precompression of spring 25 is substantially greater than that of spring 26. When fuel under pressure is present at inlet 11 plunger thus moves against spring 26 to shut off portion 17, the transverse passages 18 remaining within bore 13. There is initially, therefore, no flow from inlet 11 to outlet 12.

A continued rise in fuel pressure urges plunger 15 to the right against spring 25 until passages 18 allow passage 16 to communicate with outlet 12. The valve thus permits fuel vapour to escape until fuel under pressure is being supplied, the valve thereafter acting as a conventional relief valve.

I claim:

1. A relief valve comprising a body having an inlet, an outlet and a stepped bore interconnecting said inlet and outlet, a plunger slidable in said bore and displaceable towards the outlet by fluid pressure in the inlet, said plunger having an axial passage opening at the end of the plunger adjacent the inlet, a transverse passage in the plunger communicating with said axial passage and opening onto the outside of said plunger intermediate the ends thereof and a restricted passage in said plunger connecting said axial passage to the other end of the plunger, said transverse passage co-operating with a shoulder defined by said step in said bore in the body to provide a variable orifice between said inlet and outlet, a closure member mounted for movement within said bore and engageable with the end of said plunger remote from the inlet to prevent fluid flow through said restricted passage, first biassing means urging said closure member towards said plunger, means limiting movement of said closure member in response to said first biassing means, and second biassing means urging said plunger away from said closure member, the force exerted by said first biassing means on said closure member being greater than that required to overcome said second biassing means to engage said plunger with said closure member, whereby the plunger can move under the influence of fluid pressure in the inlet, initially against said second biassing means to engage said closure member and subsequently against said first biassing means to open said variable orifice.

2. A relief valve as claimed in claim 1 in which said first and second biasing means are springs.

3. A relief valve as claimed in claim 1 in which said first biasing means is arranged to act between the body and a spider member which carries said closure member.

4. A relief valve as claimed in claim 1 in which there is a shoulder in the body against which said spider member is engaged by the first biasing means.

5. A relief valve as claimed in claim 1 in which the closure member is formed of a flexible, resilient material.

* * * * *